M. PROHASKA.
WEEDING PLOW.
APPLICATION FILED MAR. 29, 1917.
1,248,010.
Patented Nov. 27, 1917.
2 SHEETS—SHEET 1.
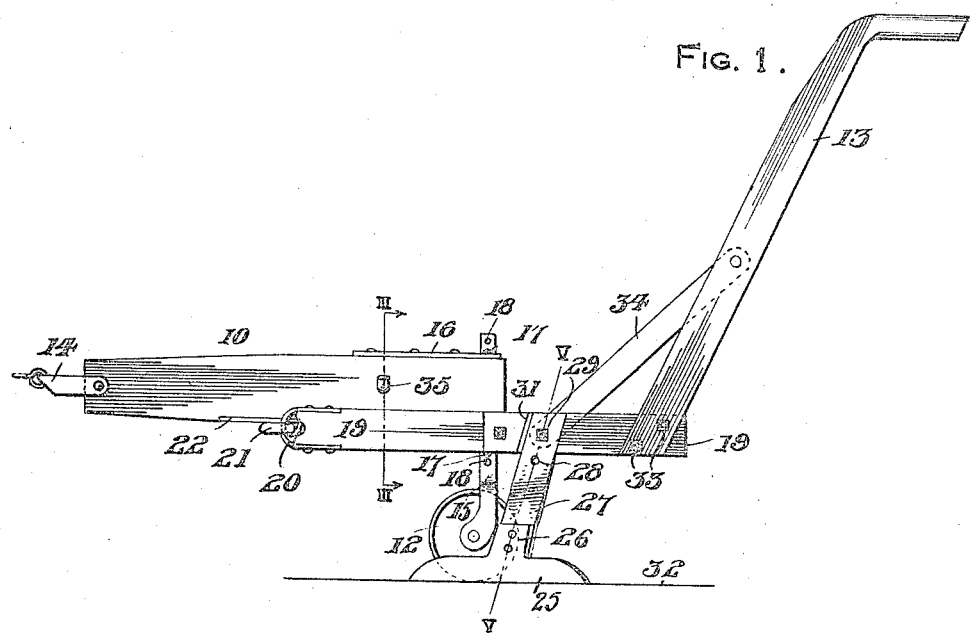
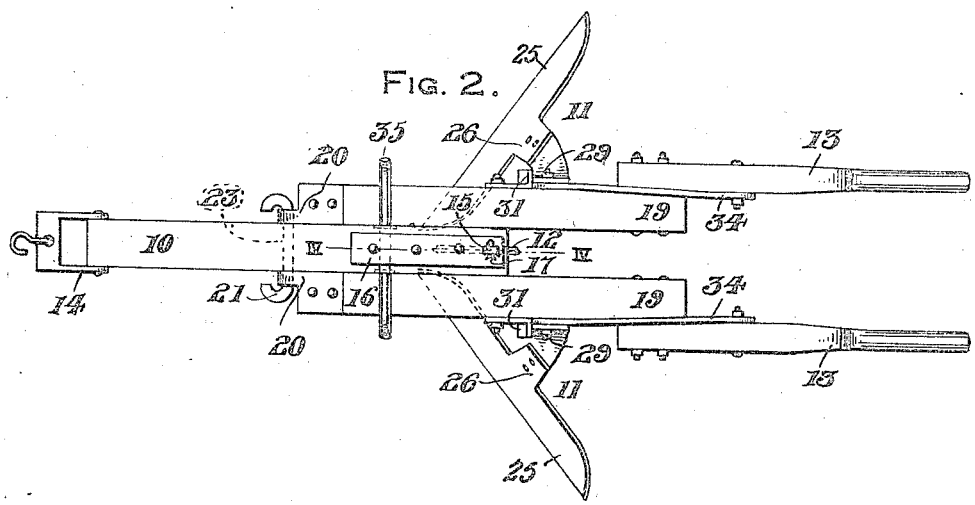
Inventor
M. Prohaska
By A. M. Wilson
Attorney

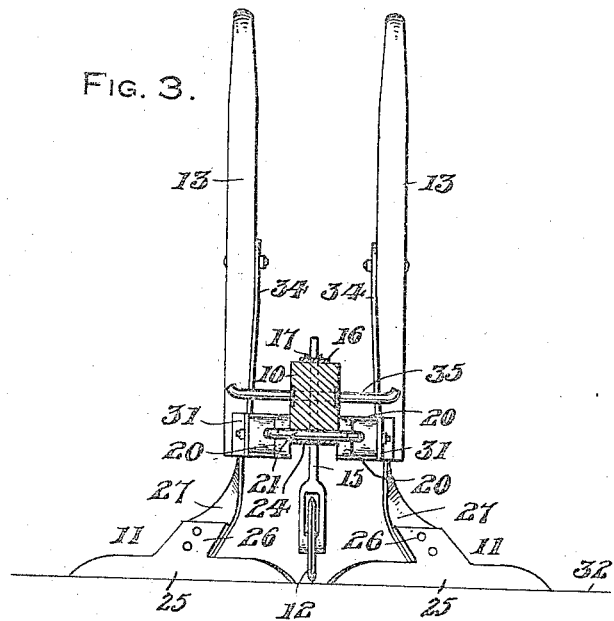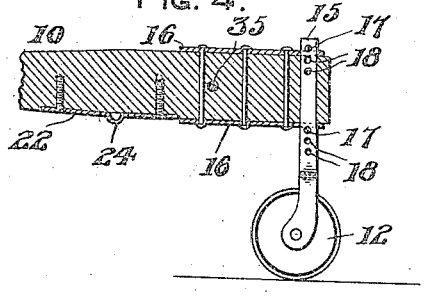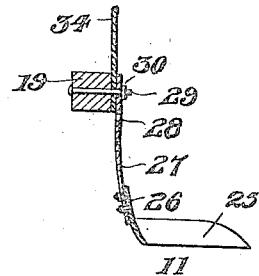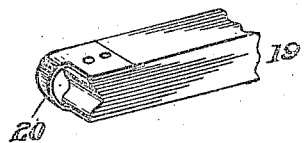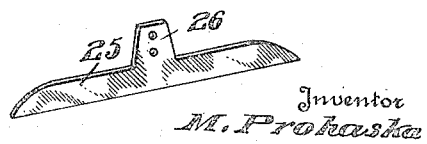

UNITED STATES PATENT OFFICE.

MELICHAR PROHASKA, OF CISTERN, TEXAS.

WEEDING-PLOW.

1,248,010. Specification of Letters Patent. Patented Nov. 27, 1917.

Application filed March 29, 1917. Serial No. 158,278.

*To all whom it may concern:*

Be it known that I, MELICHAR PROHASKA, a citizen of the United States, residing at Cistern, in the county of Fayette and State of Texas, have invented certain new and useful Improvements in Weeding-Plows, of which the following is a specification.

This invention relates to certain new and useful improvements in weeding plows.

The primary object of the invention is the provision of a plow especially adapted for employment with corn and cotton for removing weeds and mellowing the ground thereby assisting the growth of the crop.

A further object of the device is the provision of a weeder adapted for the cultivation of crops arranged in rows growing in a field, the structure being simple and inexpensive to manufacture and possessing great strength and durability.

With these general objects in view and others that will appear as the nature of the invention is better understood, the same consists in the novel construction, combination and arrangement of parts hereinafter fully described, illustrated in the accompanying drawings and pointed out in the appended claim.

In the drawings forming a part of this application and in which like numerals refer to corresponding parts throughout the several views—

Figure 1 is a side elevation of the device.

Fig. 2 is a top plan view thereof.

Fig. 3 is a vertical transverse sectional view taken upon line III—III of Fig. 1 in the direction indicated by the arrows.

Fig. 4 is a detail longitudinal sectional vertical central view taken upon line IV—IV of Fig. 2.

Fig. 5 is a transverse oblique sectional view taken upon line V—V of Fig. 1.

Fig. 6 is a perspective view of the free end portion of one of the plow beams, and, Fig. 7 is a perspective view of one of the plow blades.

The device broadly consists of a main draft beam 10 having separate hand controlled plows designated generally as 11 detachably connected to the opposite sides thereof, a supporting wheel 12 being adjustably arranged at the rear end of the draft beam while a rearwardly projecting handle 13 is provided upon the rear end of each of the plows 11, it being understood that draft animals are attached to a usual form of clevis 14 for propelling the device forwardly.

The wheel 12 is mounted in the forked lower end of a standard 15 adjustably arranged through the draft beam 10 and through bearing plates 16 on the upper and lower faces of said beam at the rear end thereof, the said draft beam being maintained at the desired elevation on the standard by the means of pins 17 extending through perforations 18 in the said standard above and below the draft beam.

Each of the plows 11 is of the same construction but of opposite arrangement, being suspended from a plow beam 19 provided with a metal loop 20 at its forward end for detachably positioning over a laterally projecting hook 21 carried at the forward end of the plow beam 19 and secured thereto by means of an attaching plate 22, a form of link or double hook 23 being inclosed within a central transverse groove or depression 24 of the plate 22, thereby arranging a hook 21 at each side of the beam 10.

Each plow beam 19 is provided with a plow or weeding blade 25 in the form of an elongated shovel having a tang 26 secured to the lower end of a curved standard 27 arranged with perforations 28 therethrough whereby the standard is secured at the desired vertical adjustment upon a projecting bolt 29 and held by a nut 30, an angular stop plate 31 being attached to the outer face of the beam 19 for positioning the standard 27 at the desired inclination for operatively arranging the blades 25 with respect to the ground or soil 32 being operated upon. The handle 13 is secured as at 33 to the plow beam near the rear end thereof, a brace or strut 34 being arranged between the handle 13 and the aforementioned bolt 29.

The beams of the plows 11 being detachably connected with the hooks 21 with the blades 25 of the plows resting upon the ground 32, said beams will be positioned upon opposite sides of the wheel 12 and the draft-beam be maintained. A rod 35 is transversely arranged through the draft beam 10 above the normal level of the plow beam 19 for limiting the upward movement of the plows 11.

The pivotal connection of the plows with the hooks 21 permits the operator to spread the rear ends of the plow beams 19 or move them inwardly so that they lie against the draft-beam, in which position they are shown in Fig. 2, thus providing for weeding as close to the rows being cultivated as may be desired.

What I claim as new is:—

A device of the type described, including a draft-beam, a wheel-support for the rear end of said draft beam, plow-beams provided with loops at their forward ends, said draft-beam being provided with a hook-ended member for engagement with said plow-beam carried hooks, said draft-beam hook-ended member and plow-beam loops allowing of the spreading apart of said plow-beams, said draft-beam, also being provided with a stop-rod ending transversely therethrough with its laterally extending portions adapted to control or limit the upward movement of the plow-beams, and means for aiding the lateral or spreading apart movement of said plow-beams.

In testimony whereof I affix my signature.

MELICHAR PROHASKA.